(12) United States Patent
Brittenham

(10) Patent No.: US 7,480,110 B2
(45) Date of Patent: Jan. 20, 2009

(54) MEDIUM DEPENDENT WRITE EQUALIZATION

(75) Inventor: Steven L. Brittenham, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 282 days.

(21) Appl. No.: 11/106,246

(22) Filed: Apr. 13, 2005

(65) Prior Publication Data
US 2006/0232871 A1    Oct. 19, 2006

(51) Int. Cl.
*G11B 5/035* (2006.01)
(52) U.S. Cl. ........................................... 360/65
(58) Field of Classification Search ............... None
See application file for complete search history.

(56) References Cited

U.S. PATENT DOCUMENTS

| | | | |
|---|---|---|---|
| 5,025,327 A * | 6/1991 | Stamness et al. | 360/45 |
| 5,184,256 A * | 2/1993 | Chikusa | 360/65 |
| 5,187,614 A * | 2/1993 | Hashimoto et al. | 360/45 |
| 5,255,130 A | 10/1993 | Buchan et al. | |
| 5,267,096 A * | 11/1993 | Buchan et al. | 360/41 |
| 5,339,202 A * | 8/1994 | Heinz et al. | 360/46 |
| 5,493,454 A * | 2/1996 | Ziperovich et al. | 360/45 |
| 5,579,119 A * | 11/1996 | Mimura | 386/9 |
| 5,754,593 A | 5/1998 | Koren | |
| 5,774,505 A | 6/1998 | Baugh | |
| 5,872,665 A | 2/1999 | Millican et al. | |
| 6,831,797 B2 | 12/2004 | Koller et al. | |
| 7,139,141 B1 * | 11/2006 | Cates et al. | 360/31 |
| 2003/0048564 A1 | 3/2003 | Koller et al. | |
| 2004/0168024 A1 | 8/2004 | Buckingham | |

OTHER PUBLICATIONS

Richard C. Schneider, Write Equalization in High-Linear-Density Magnetic Recording, Nov. 1985, IBM Journal of Research and Development, vol. 29, No. 6, pp. 563-568.*

Oklobdzija, Vojin G. *Circuit Implementation Techniques For the Magnetic Read/Write Channels*. 2000-01.

Schneider, Richard C. *Write Equalization In High-Linear-Density Magnetic Recording*. Nov. IBM J. Res. Develop., Nov. 1985, pp. 563-568, vol. 29, No. 6.

*HP Storage Works Ultrium 960 Tape Drive Technical White Paper*. Dec. 2004, pp. 1-19.

* cited by examiner

*Primary Examiner*—Joseph H Feild
*Assistant Examiner*—Daniell L Negrón

(57) ABSTRACT

A medium dependent write equalization method is disclosed. The method includes identifying a trait of a magnetic medium. A characteristic of a write equalization signal is then defined according to the identified trait of the magnetic medium.

22 Claims, 11 Drawing Sheets

MEDIUM DEPENDENT WRITE EQUALIZATION

Binary data is stored on magnetic media by magnetizing small areas of the magnetic surface with one of two polarities. When writing data, a write system passes a write current through an inductive head. A write current in one direction through the head sets the polarity of the media adjacent to the head to one polarity; a reverse in current direction sets the opposite polarity. The transition between polarities is called a flux transition. A flux transition occurring at a data bit location may represent a one bit, and a no flux transition may represent a zero bit. The opposite may instead be true. A flux transition occurring at a data bit location may represent a zero bit, and a no flux transition may represent a one bit. More generally, a flux transition occurring at a data bit location represents a transition bit which may be a one bit or a zero bit. The absence of a flux transition at a data bit location represents a non-transition bit. Data bits as described here, depending on the encoding scheme used, may or may not map into actual customer data bits.

In one example of a magnetic mass storage system implementation, previously written media is passed under a magneto-resistive (MR) head. The resistance of the head varies as the magnetic flux changes when passing over the alternating magnetic fields of the previously recorded small magnetized areas. A constant current is passed through the head, converting resistance changes to voltage variations. Thus, the flux transitions are converted into voltage pulses, so that the information in a resulting read signal is encoded in the temporal spacing of pulse peaks. A pulse is a single vibration of voltage or current in a signal. The read system samples pulse sequences to decode the corresponding binary data.

To help shape the pulses for the read system, the write system can add write equalization pulses to the write current. Write equalization pulses occur at a faster rate than that at which the transition bits are written. One use of the write equalization pulses is to "AC-erase" the media between largely separated pulses, preventing saturation of the MR head during read back and providing lossless slimming of the read back pulse shape. Accordingly, write equalization pulses typically are added for relatively sparse patterns of the binary data and not for relatively dense patterns that are self-slimming and naturally limited in read back amplitude. As an example, a sparse pattern could be a single or a sequence of two, three or four or more consecutive non-transition bits. A dense pattern could be a single or a consecutive sequence of two, three, or four or more consecutive transition bits.

Write equalization pulses typically have a single fixed width set as a fraction of the write clock. Not all magnetic media and heads write the same way, so for multiple head vendors and/or interchange reasons, a single pulse width may not be optimum. In other words, equalization pulses of a given fixed width may not be optimal for use by a particular head when writing to a magnetic medium of a particular type.

DRAWINGS

Figure 6:
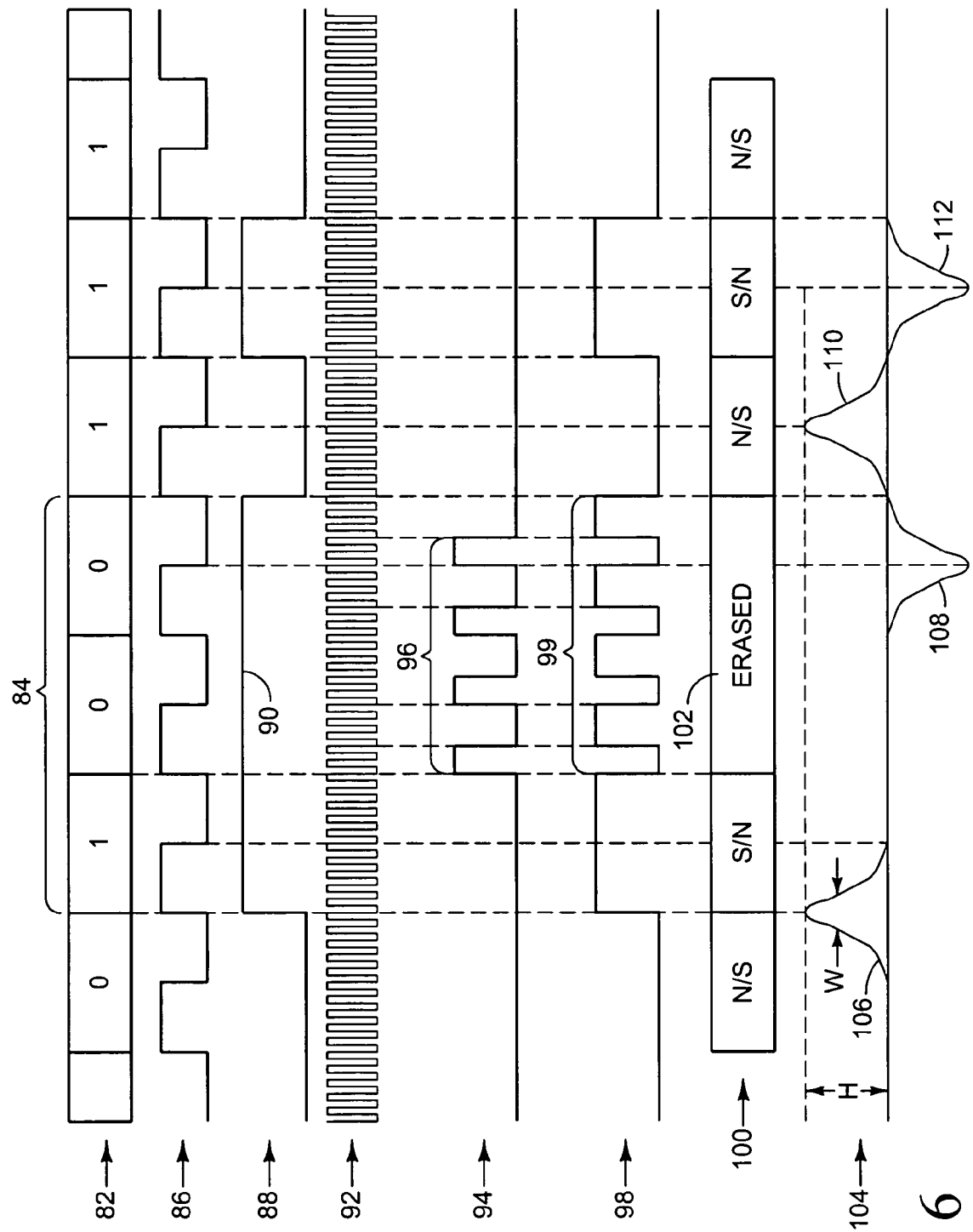

FIG. 6 illustrates an exemplary write data sequence, an exemplary write clock signal, an exemplary write signal generated according to the write data sequence, an exemplary write equalization clock signal, an exemplary write equalization signal generated according to the write data sequence, a combination of the write signal and the write equalization signal, the exemplary magnetization of magnetic media based on the combined signal, and an exemplary read signal taken from the magnetic media.

Figure 7:
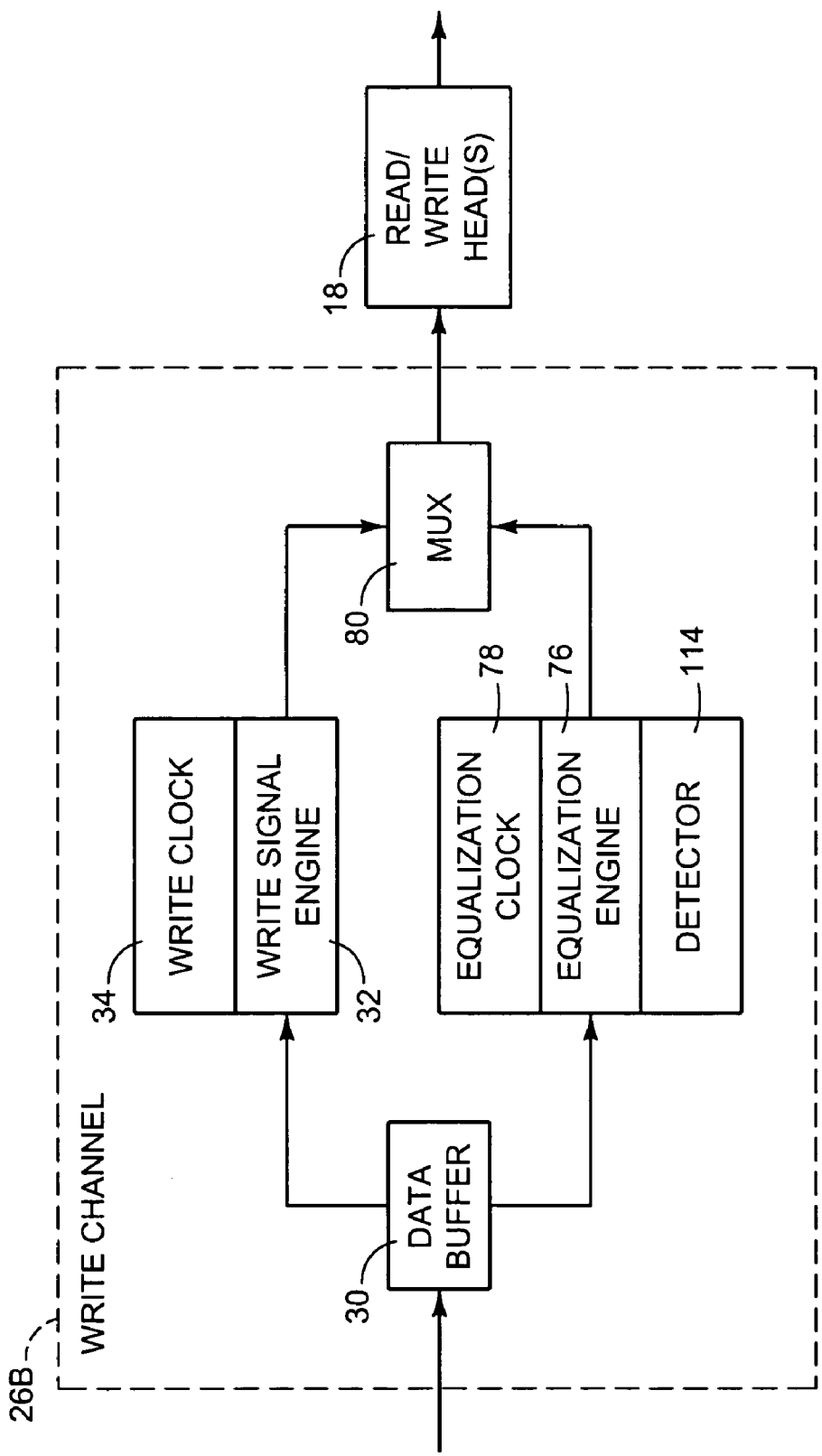
Figure 8:
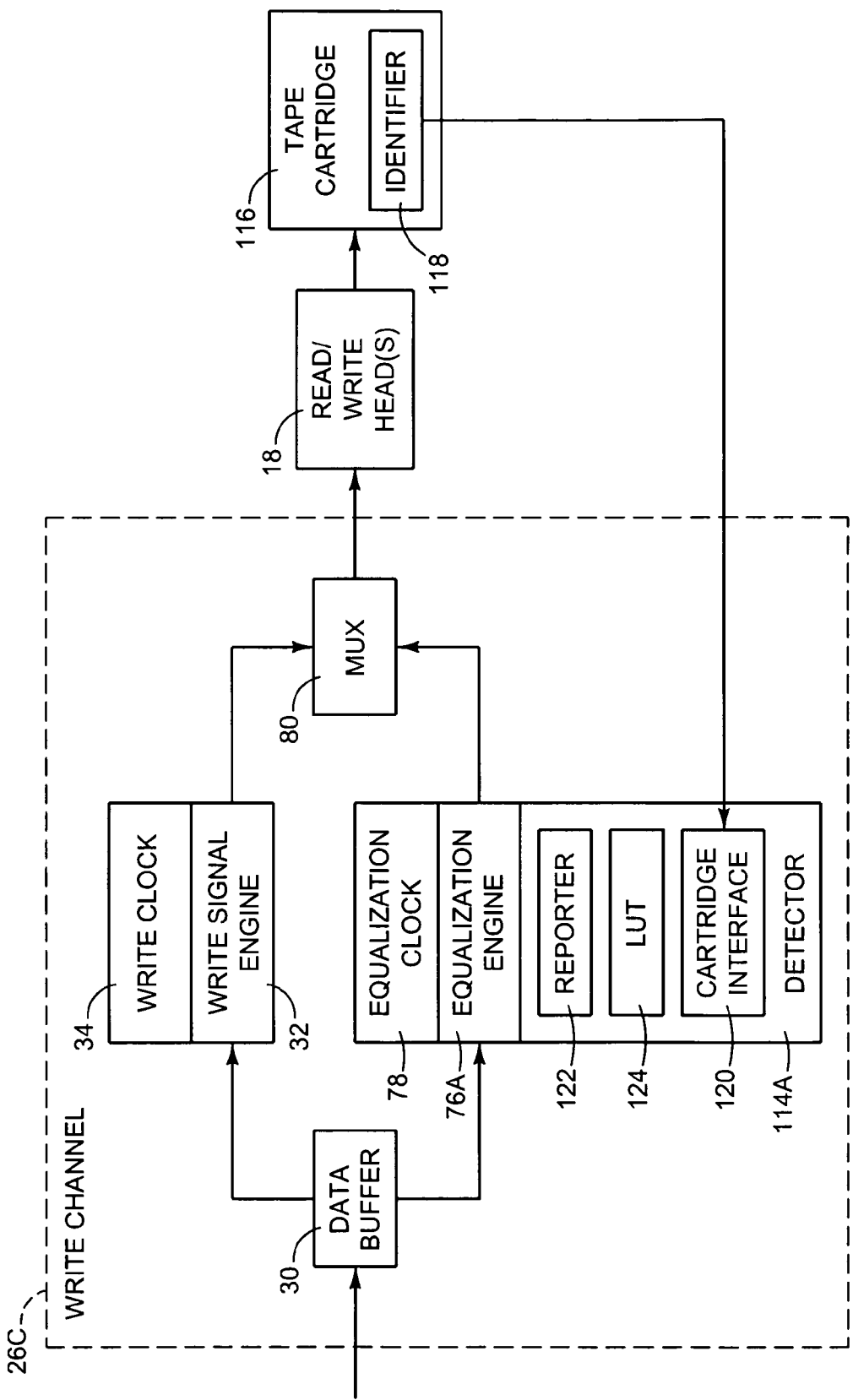
Figure 9:
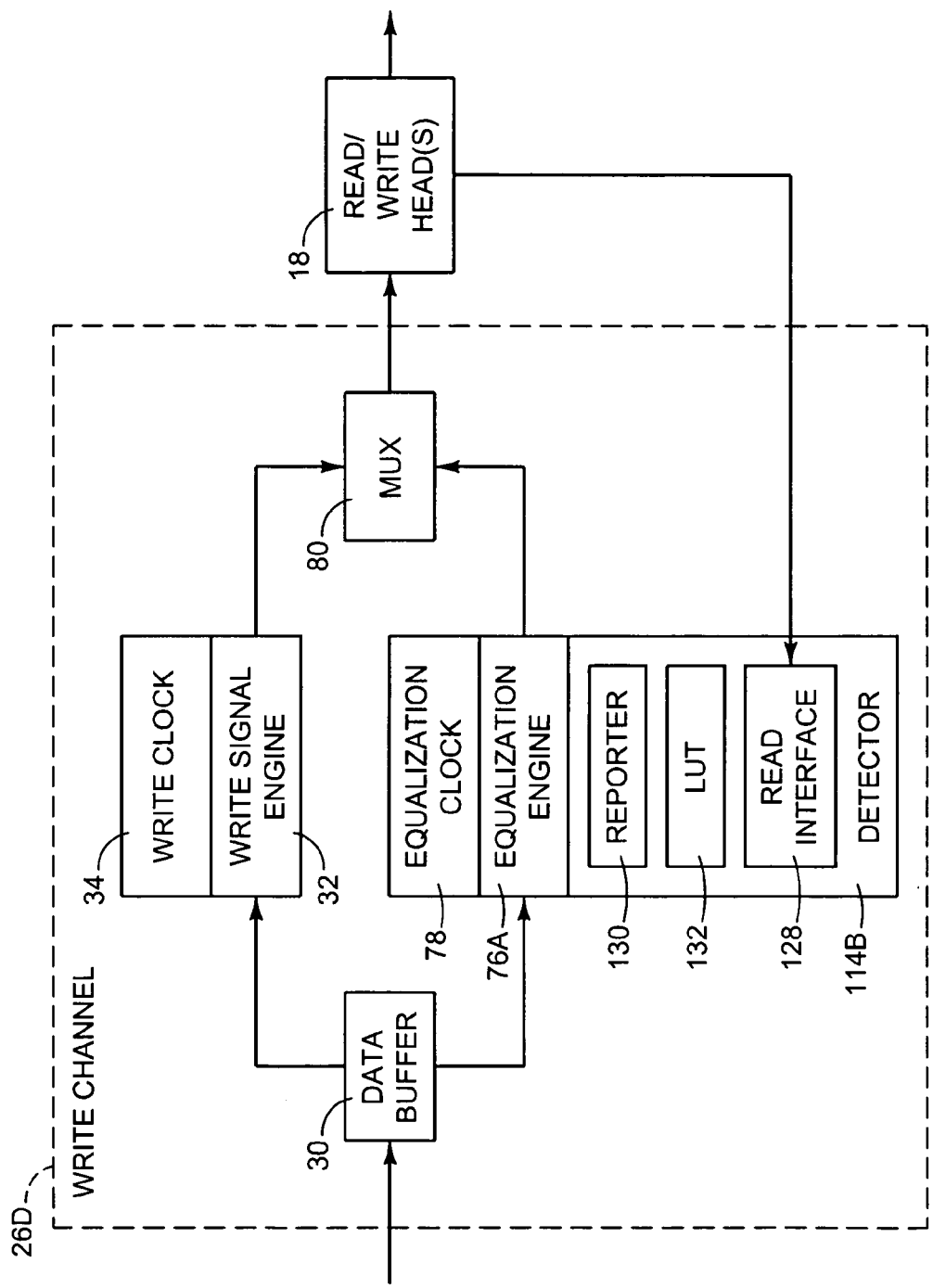

FIGS. 7-9 are block diagrams of various exemplary implementations of a write channel.

Figure 10:
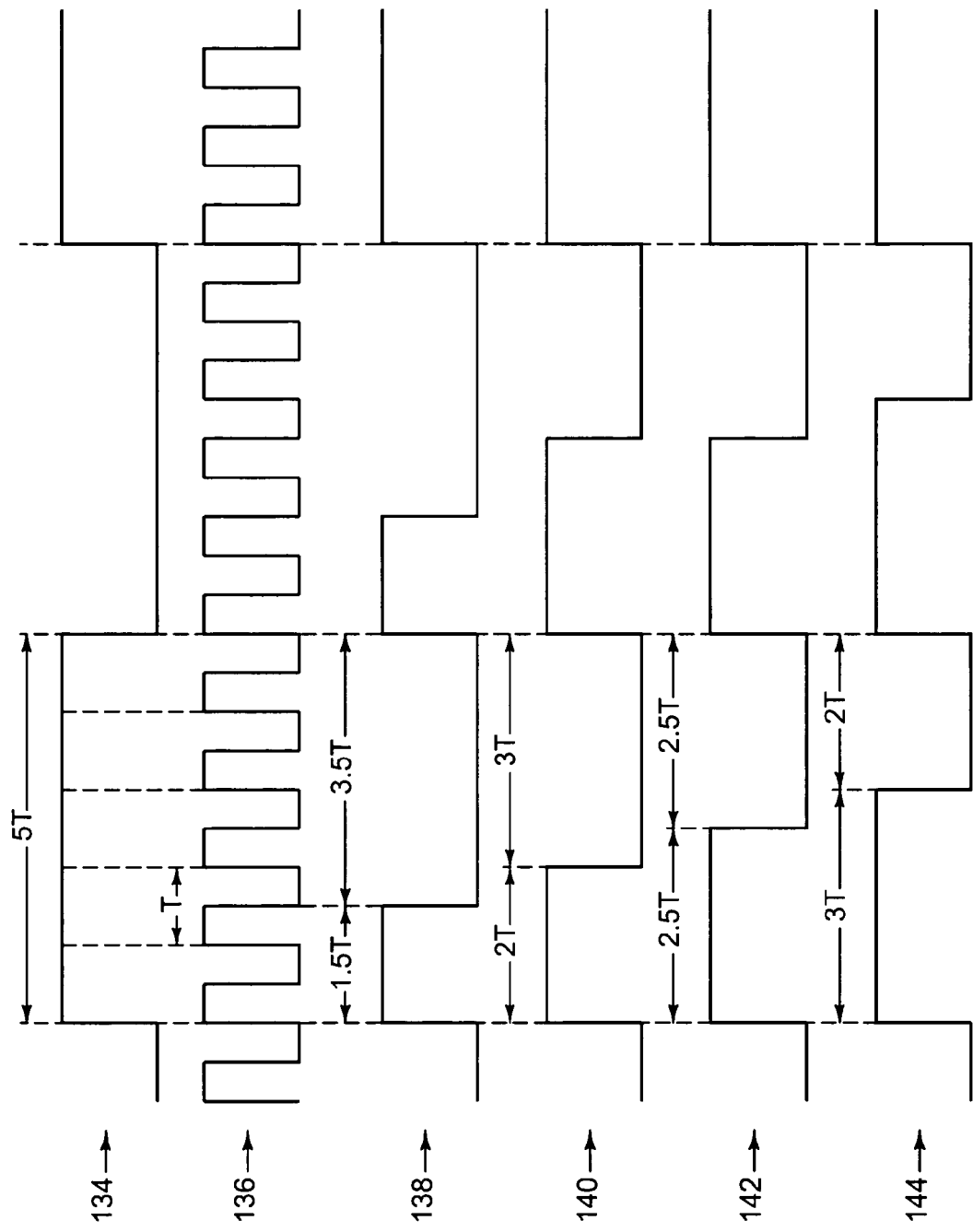

FIG. 10 illustrates an exemplary write clock signal, an exemplary write equalization clock signal, and various write equalization signals having variously shaped write equalization pulses.

Figure 11:
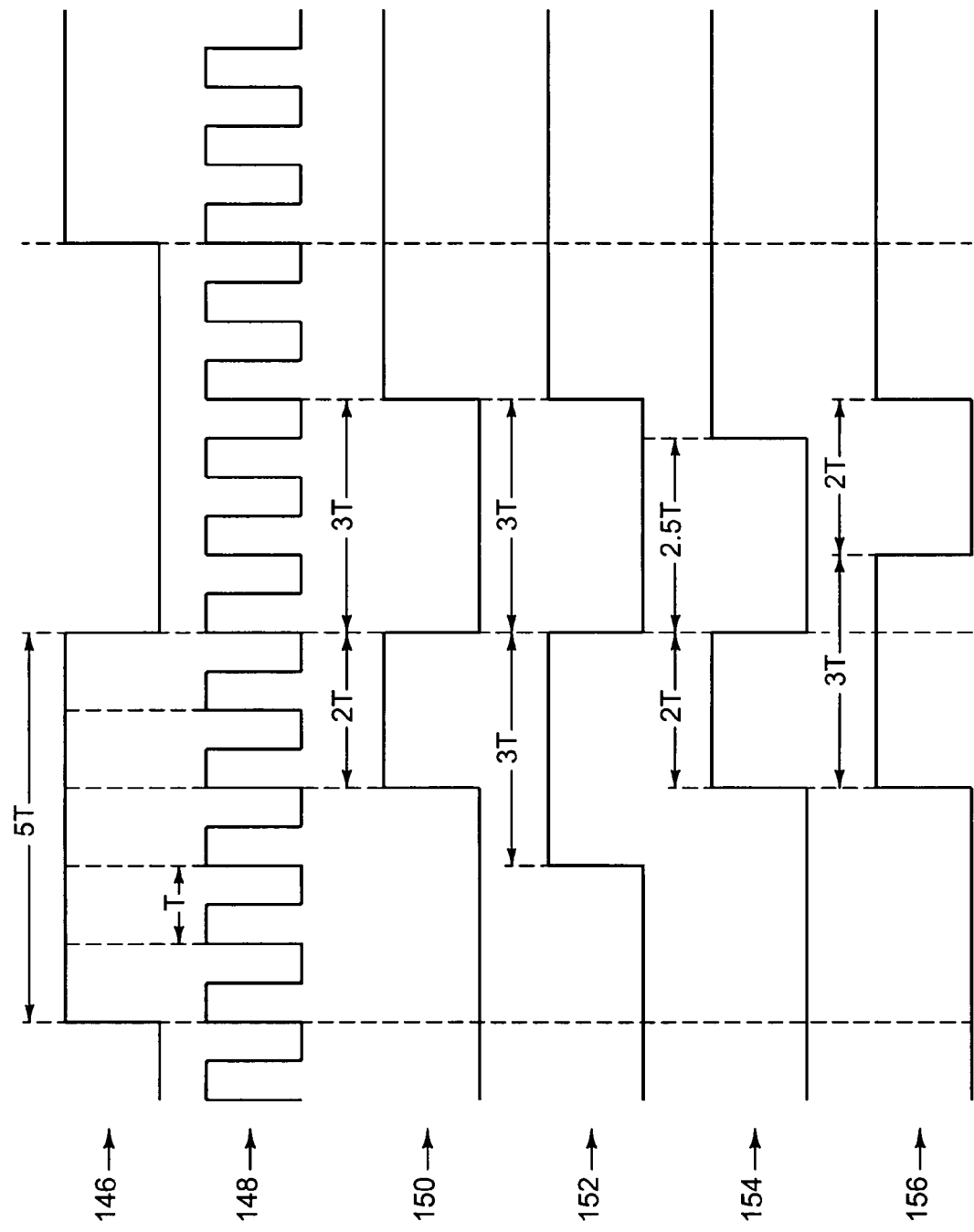

FIG. 11 illustrates an exemplary write clock signal, an exemplary write equalization clock signal, and various write equalization signals having variously shaped and timed write equalization pulses.

Figure 12:
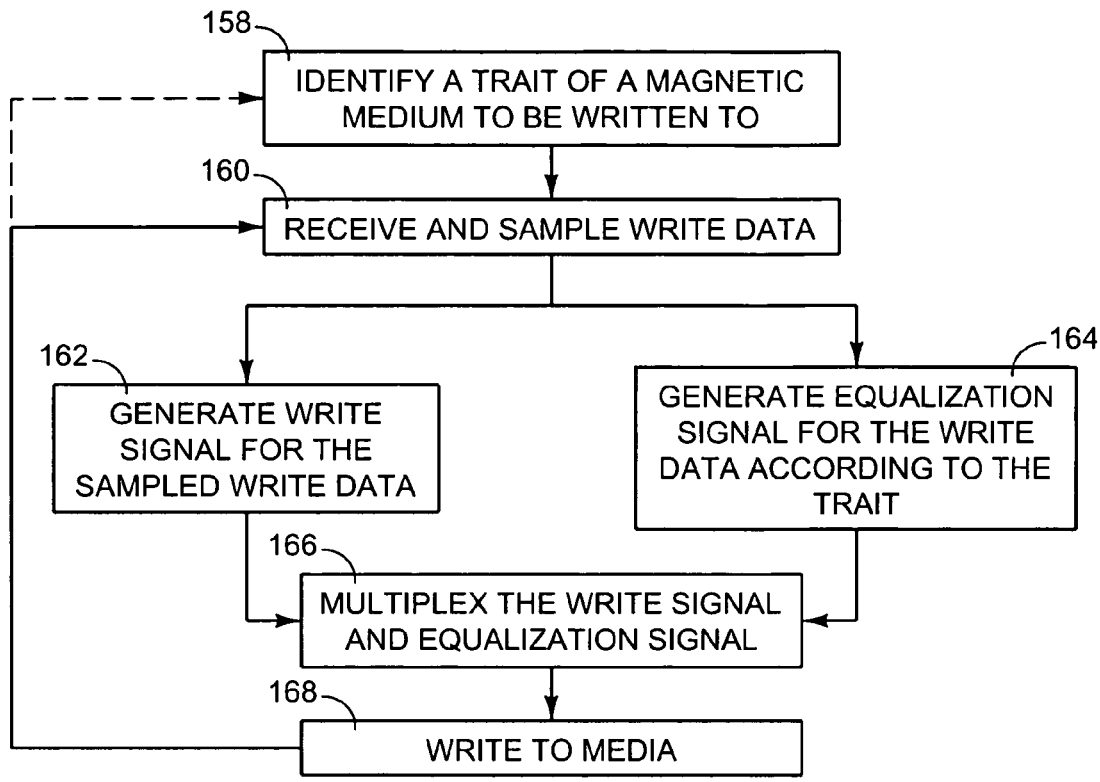
Figure 13:
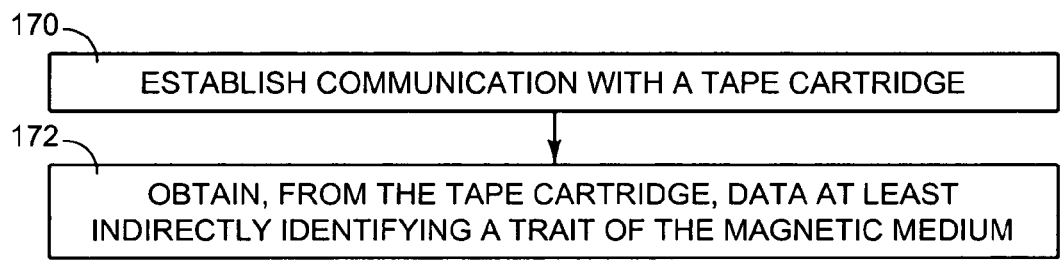
Figure 14:
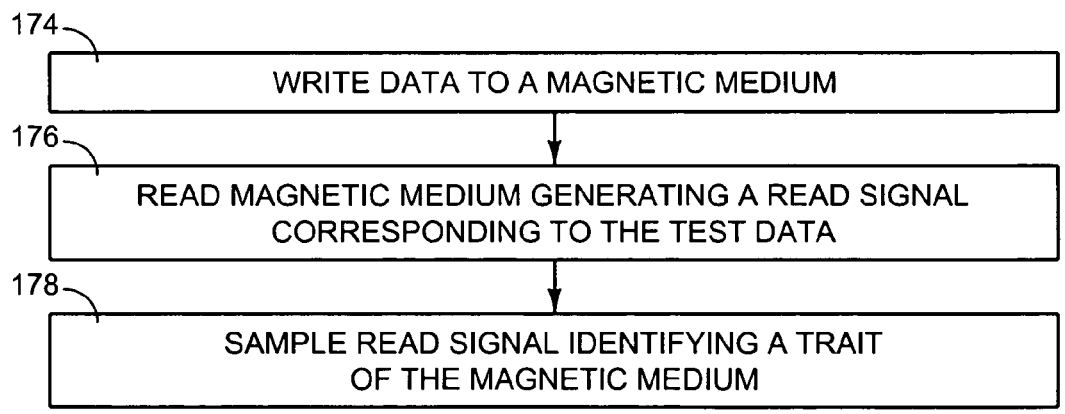

FIGS. 12-14 are exemplary flow diagrams illustrating steps taken to implement various embodiments of the present invention.

DETAILED DESCRIPTION

INTRODUCTION: Magnetic media produced by one manufacturer may have characteristics different than magnetic media from another manufacturer. Similarly, write heads may have different characteristics depending on their source. When writing data to magnetic media, write equalization is used to shape the voltage pulses for the read system. Typically, write equalization pulses have a fixed width that may not be optimal for a particular magnetic medium, write head, or combination of the two. Various embodiments, described below, operate to vary the width of equalization pulses to "tune" the writing process to a particular head and medium combination, The following description is broken into sections. The first section labeled "Magnetic Media" describes an exemplary magnetic media drive and the manner in which the drive encodes data. The second section labeled "Write Equalization" describes the function of write equalization. The third section labeled "Medium Dependence" describes various implementations where the manner in which write equalization is implemented is dependent upon the magnetic medium to which the data is being written.

Figure 1:
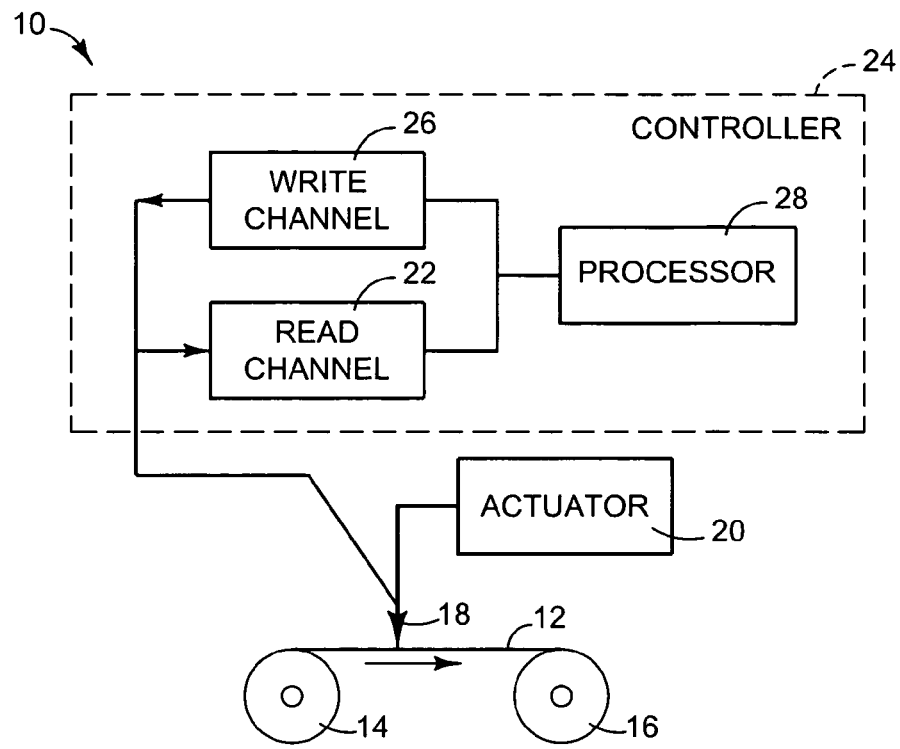
FIG. 1 is a simplified block diagram of principal portions of a typical magnetic tape drive associated with the reading and writing of data.

MAGNETIC MEDIA: FIG. 1 illustrates an exemplary magnetic media drive's read/write components 10 in which embodiments of the present invention may be implemented. Implementation, however, are not limited to use with tape drives. Embodiments may be implemented in other data storage products.

Media drive 10 writes to and reads from magnetic tape 12 which is fed from supply reel 14 to take-up reel 16 along a tape path passing by read/write head 18. Actuator 20 positions head 18 over magnetic tape 12 to read from or write on specific tracks (stripes) down the tape 12. During a read operation, signals pass from head 18 to read channel 22 located on controller 24. During a write operation, signals pass from write channel 26 to head 18. Controller 24, which includes a processor 28, controls the operation of the tape drive, including reels 14 and 16, actuator 20, read channel 22 and write channel 26. Controller 24 receives read instructions, write instructions, and data from a computer or other host.

Although only one head 18 and associated read channel 22 and write channel 26 are shown, typical magnetic media can have multiple tracks, and such tape drives will usually have an array of many such heads formed in a composite head structure. The controller will include a read channel and a write channel for each head in the array. In some tape drives, separate read heads and write heads are used instead of combined read and write heads, as may be pairs of heads to facilitate read after write operation in both directions of motion of the recording medium.

Figure 2:
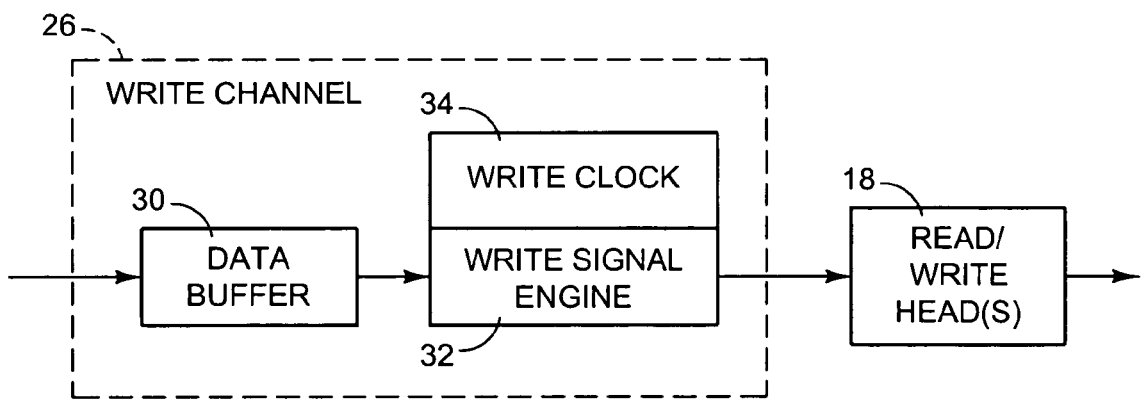
FIG. 2 is a simplified block diagram of one implementation of a write channel.

Moving to FIG. 2, an exemplary write channel 26 is shown to include data buffer 30, write signal engine 32, and write clock 34. Data buffer 30 represents generally any suitable hardware serving as a temporary storage for data to be written—write data. Write signal engine 32 represents generally any combination of hardware and/or programming capable of generating a write signal corresponding to write data sampled from data buffer 30. A write signal is a signal generated to cause write head 18 to encode magnetic media with write data. For example, a write signal may be a write current in which a transition or reverse in current direction through write head 18 may represent a one bit and the absence of a transition may represent a zero bit.

Alternatively, a transition or reverse in current direction through write head 18 could represents a zero bit and the absence of a transition at a data bit location could represents a one bit. More generally, the bit represented by a transition in a write signal can be referred to as a transition bit as opposed to a non-transition bit. In the examples that follow, one bits are shown to be transition bits, but zero bits could just as easily be transition bits with the one bits being non-transition bits.

Write clock 34 represents any combination of hardware and/or programming suitable for providing a write clock signal to write signal engine 32. The write clock signal sets the timing of any transitions in the write signal. Without write equalization, the write clock generally represents the resolution of possible transition spacings allowed on the storage medium. With write equalization, the write clock is generally a multiple of the possible transition spacings, allowing for the writing of pulses at rates too fast for the storage medium to resolve.

Figure 3:
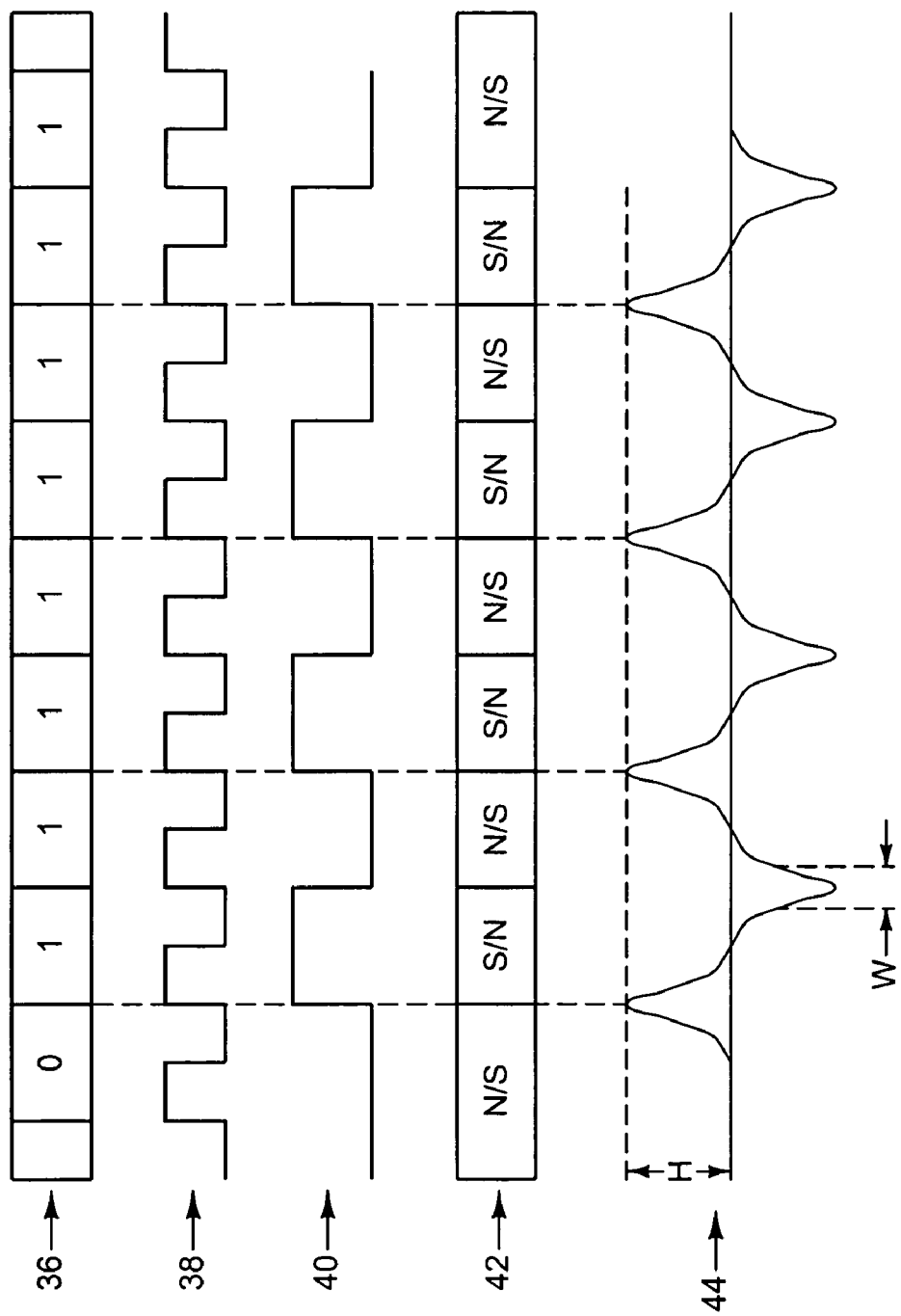
FIG. 3 illustrates an exemplary write data sequence, an exemplary write clock signal, an exemplary write signal, the exemplary magnetization of magnetic media based on the write signal, and an exemplary read signal taken from the magnetic media.

FIG. 3 illustrates an example of a stream of write data 36, a write clock signal 38, a corresponding write signal 40, magnetic media 42, and a read signal 44. Write data 36, read from left to right, represents a stream of binary data to be encoded on magnetic media 42. Here, a transition occurs in write signal 40 for each transition bit—in this example, for each one bit. Each transition occurs on a rising edge of write clock signal 38 and results in a change in polarity of the magnetic fields encoded on magnetic media 42. Consequently, sequential areas of magnetic media 42 are encoded with alternating and opposing magnetic fields. The transition from one field to another results from a transition of write signal 40. In the examples shown, "N/S" represents a relative North-to-South polarization while "S/N" represents a South-to-North polarization.

When a magneto-resistive head is used to read magnetic media 42, a read signal 44 is generated that includes a series of pulses. Each pulse in read signal 44 represents a transition from one magnetic field to another as detected by the head. With the relatively high and consistent frequency of transitions in the polarization of magnetic media 42, the height "H" and width "W" of the read signal pulses are generally uniform, allowing the read signal to be more easily translated into a form corresponding to write data 36.

Figure 4:
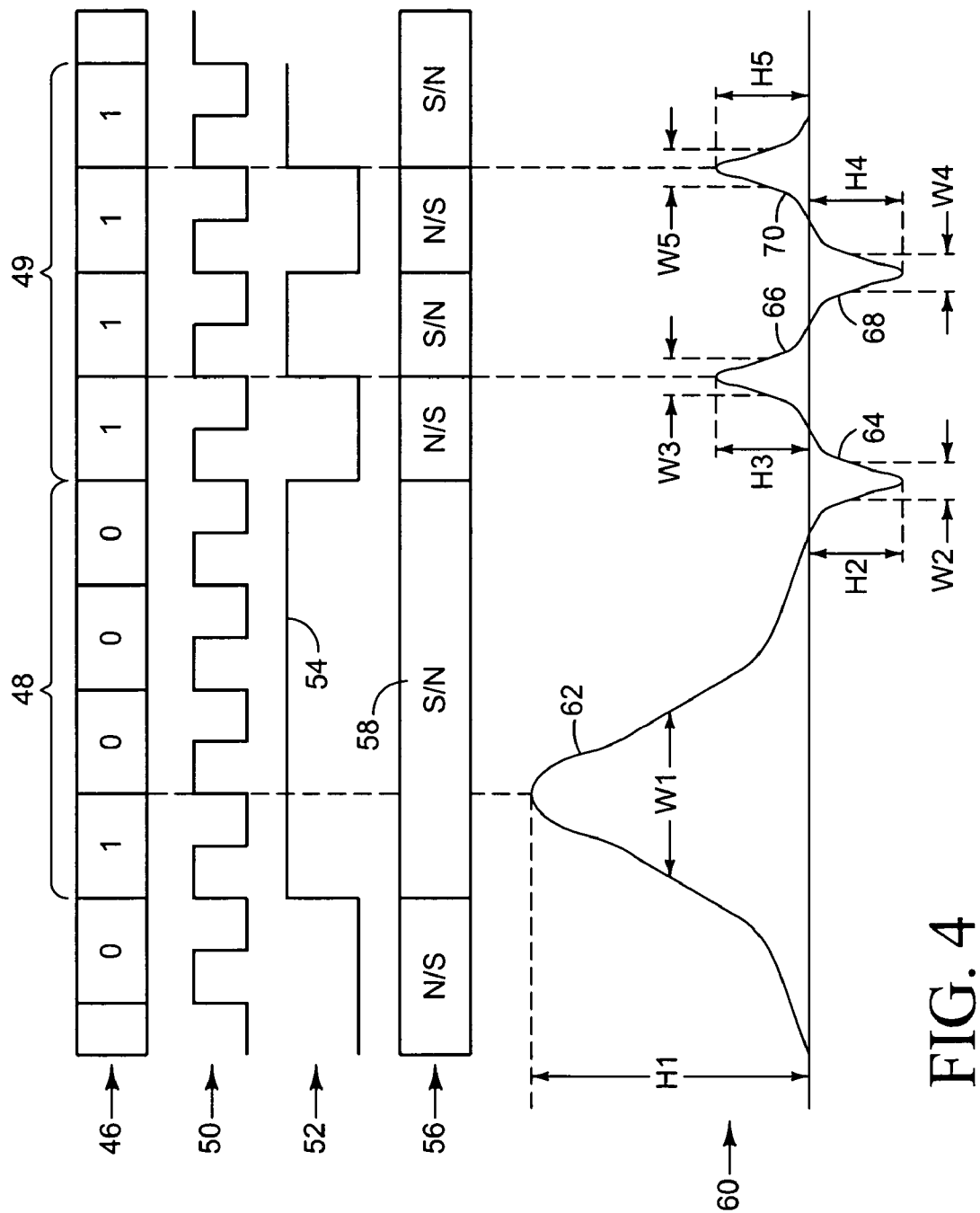
FIG. 4 illustrates an exemplary write data sequence, an exemplary write clock signal, an exemplary write signal, the exemplary magnetization of magnetic media based on the write signal, and an exemplary read signal taken from the magnetic media.

Sparser (more widely separated) polarization of magnetic media can create undesirable non-linear pulse characteristics when reading back the example signal illustrated in FIG. 4. A stream of write data 46 containing a relatively sparse data pattern 48 and a relatively high density data pattern 49, a write clock signal 50, and a write signal 52 corresponding to write data 46. Again, in this example, a transition in write signal 52 occurs for each one bit in write data 46 with each transition occurring on a rising edge of write clock signal 50. Having only a single transition bit (a one bit at the beginning followed by three zero bits in this example), sparse pattern 48 creates a relatively long, low-frequency pulse 54 in write signal 52. Pulse 54 can be said to represent a relatively long duration of non-transition in write signal 52. High density pattern 49 of write data 46 includes a consecutive series of transition bits and creates a series of relatively short, high frequency pulses 55. Each of the pulses in 55 can be said to be a relatively short duration of non-transition of write signal 52.

Sequential areas of magnetic media 56 are encoded with alternating and opposing magnetic fields. The transition from one field to another results from a transition of write signal 52. The relatively large size of pulse 54 creates an area 58 on magnetic media 56 with a relatively low frequency in the transition between differing magnetic fields. The relatively small size of pulses 55 creates an area 59 on magnetic media 56 with a relatively high frequency in the transition between differing magnetic fields.

When a magneto-resistive head is used to read magnetic media 56, a read signal 60 is generated that includes a series of pulses 62-72 each representing a transition from one magnetic field to another as detected by the head. Pulse 62 results from the relatively low frequency transition in magnetic field from "N/S" to "S/N" in area 58 of magnetic media 56. Pulses 64-72 result from the relatively high frequency transitions between opposing magnetic fields in area 59 of magnetic media 56. The relatively low frequency of transitions in area 58 saturates the magneto resistive head, increasing the height (H1) and width (W1) of pulse 62. The relatively high frequency of transitions in area 59 results in pulses having generally uniform heights (H2-H5) and widths (W1-W5).

Most read channels require linearity in the read signal to effectively recover the originally written data. Any saturation in pulse 62 compared to pulses 64-72 results in non-linearities that make read signal 60 difficult to translate into a form corresponding to write data 46.

Figure 5:
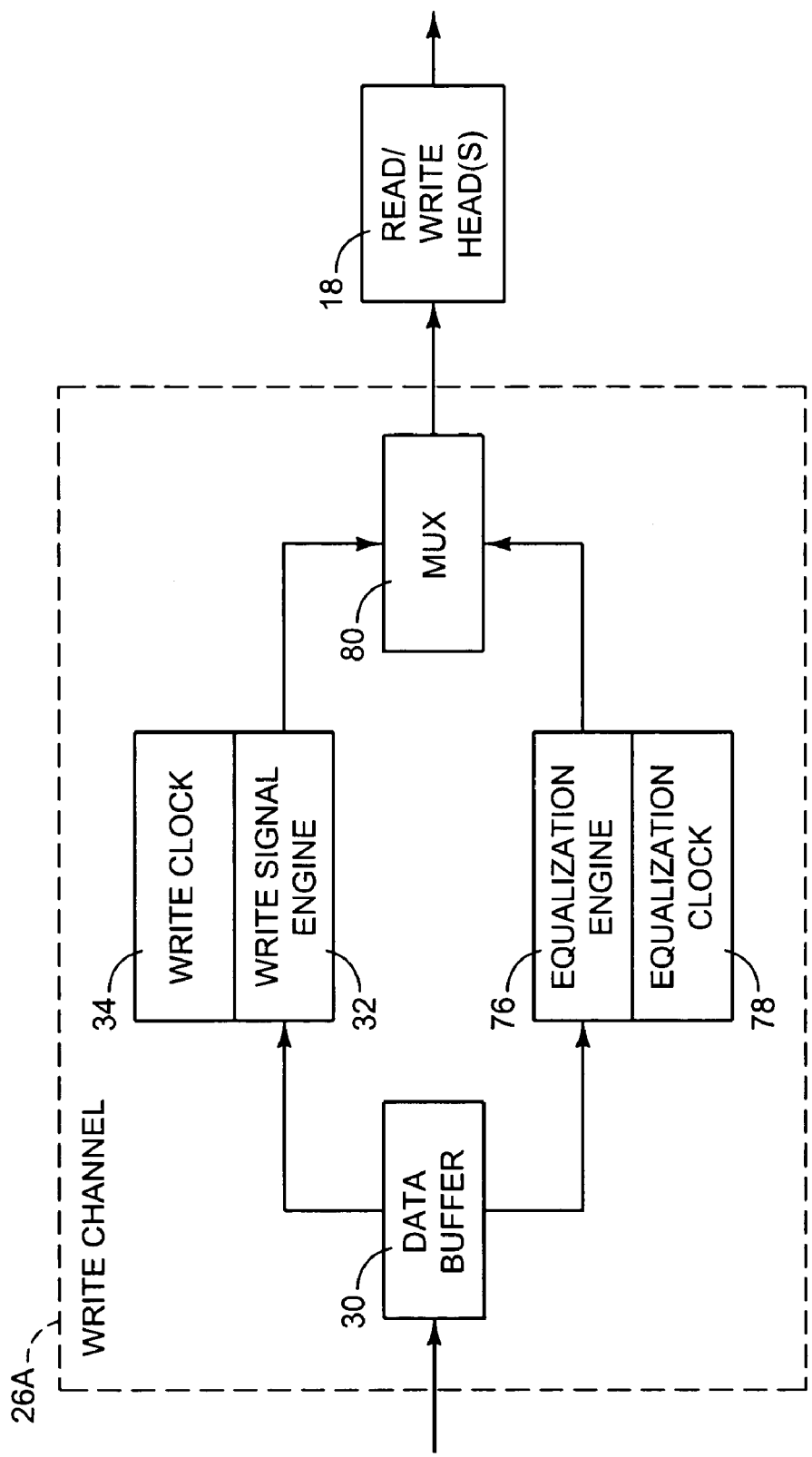
FIG. 5 is a block diagram of another implementation of a write channel.

WRITE EQUALIZATION: A process referred to as write equalization is used to help properly shape the read signal where sparse patterns in the write data would otherwise cause saturation in the read signal. Moving to FIG. 5, an exemplary write channel 26A is shown to include data buffer 30, write signal engine 32, and write clock 34 as well as equalization engine 76, equalization clock 78, and multiplexer 80. It is noted that write signal engine 32 and write clock 34, equalization engine 76 and equalization clock 78, and multiplexer 80 can be implemented in a single hardware block to create a combined engine capable of properly encoding write- and non write-equalized clock and data pulses.

Equalization engine 76 represents generally any combination of hardware and/or programming capable of generating a write equalization signal for relatively sparse data patterns sampled from data buffer 30. Equalization clock 78 represents generally any combination of hardware and/or programming suitable for providing a write equalization clock signal to equalization engine 76. Multiplexer 80 represents generally any combination of hardware and/or programming capable of combining the write signal and the write equalization signal into a common signal to be sent to write head 18.

A write equalization signal is a series of pulses at a frequency too high for magnetic media to respond. In other words, instead of magnetizing areas of the magnetic media, the write equalization pulses act to erase the magnetic media. For relatively dense patterns, the write equalization signal may have no pulses. In other words, write equalization may be turned off. A dense pattern, for example, could be a single or a consecutive sequence of two, three, or four or more consecutive transition bits. For relatively sparse patterns, the write equalization signal will have corresponding pulses.

FIG. 6 provides an example of the effects of write equalization. A stream of write data 82 containing a relatively sparse data pattern 84, a write clock signal 86, and a write signal 88 corresponding to write data 82. As before, a transition in write signal 88 occurs for each one bit in write data 82 with each transition occurring on a rising edge of write clock signal 86. Having only a single transition bit (a one bit in this example), sparse pattern 84 creates a relatively long, low-frequency pulse 90 in write signal 88.

FIG. 6 also shows equalization clock signal 92. In the example shown, the frequency of equalization clock signal 92 is ten times that of write clock signal 86. It is noted that the actual multiplier between equalization clock signal 92 and write clock signal 86 may be dependent on the resolution of the final write equalization edges illustrated by write equalization 94 and can be any linear or fractional multiple of write clock signal 86, depending on the particular implementation. Write equalization signal 94 contains pulses 96 timed to correspond with the non-transition or zero bits of sparse data pattern 84. The shape of write equalization pulses 96 can be described by their duty cycle. Each pulse 96 has a duty cycle selected as a function of equalization clock signal 92. As shown, that duty cycle is ⅖. In other words, each pulse 96 is at a high state for two periods of equalization clock signal 92 and at a low state for three periods of equalization clock signal 92. The duty cycle indicates that write equalization pulses 96 are at a high state two-fifths of the time.

Multiplexing write signal 88 and write equalization signal 94 results in combined signal 98. Here, write equalization signal 94 has been subtracted from write signal 88. As a result, write equalization pulses 99, which are inverted counterparts to write equalization pulses 96, shorten low frequency pulse 90 into a higher frequency pulse 99.

Sequential areas of magnetic media 100 are encoded with alternating and opposing magnetic fields. The transition from one field to another results from a transition of combined signal 98. Write equalization pulses 99 are timed at a frequency too high for magnetic media 100 to respond. As a result, write equalization pulses 99 serve to erase a corresponding area 102 of magnetic media 100.

When a magneto-resistive head is used to read magnetic media 100, a read signal 104 is generated that includes a series of pulses 106-112 each representing a transition from one magnetic field to another as detected by the head. Erased area 102 serves as a pause between transitions and prevents pulse 106 from growing too large. As a result, the height "H" and width "W" of the read signal pulses are not allowed to saturate the magneto resistive head, maintaining linearity and allowing the read signal to be more easily translated into a form corresponding to write data 82.

MEDIUM DEPENDENCE: Summarizing the prior section, where a stream of write data includes a sparse data pattern, a write equalization signal is combined with a corresponding write signal. The write equalization signal includes one or more higher frequency pulses to help properly shape a resulting read signal. Instead of using write equalization pulses with fixed characteristics (as in the prior section), the write equalization pulse characteristics can be tuned based on a trait of the particular magnetic medium in use. Characteristics of a write equalization signal include the timing and shaping of the write equalization pulses. A trait of a magnetic medium, for example, can include the identity of its manufacturer. A trait can also include a unique manner in which a particular type of medium responds. Further, if one or more properties of the medium is sensed to change depending on position down that medium, write equalization can be adapted dynamically to the changes. For example, the same data may be written to magnetic media from different manufacturers. The characteristics of a read signal corresponding to that write data may vary from one medium to the next, or even down the length of the medium.

Moving to FIG. 7, an exemplary write channel 26B is shown to include data buffer 30, write signal engine 32, and write clock 34 as well as equalization engine 76A, equalization clock 78, multiplexer 80, and detector 114. Detector 114 represents generally any combination of hardware and/or programming capable of identifying a trait of a magnetic medium. Equalization engine 76A represents generally any combination of hardware and/or programming capable of generating a write equalization signal having one or more characteristics defined according to the identified a trait of the magnetic medium. Equalization clock 78 represents generally any combination of hardware and/or programming suitable for providing a write equalization clock signal to equalization engine 76. Multiplexer 80 represents generally any combination of hardware and/or programming capable of combining the write signal and the write equalization signal into a common signal to be sent to read/write head(s) 18.

In the examples discussed below with reference to FIGS. 8 and 9, detector 114 can identify a trait of a given magnetic medium by discovering a source of the medium or by sampling a read signal corresponding to a known set of write data encoded on the magnetic medium. Equalization engine 76A can then tune the characteristics of write equalization pulses according to that trait. This tuning can take place the first time the medium is used, initially after each loading of the magnetic medium, or dynamically as the medium is being written to.

Staring with FIG. 8, an exemplary write channel 26C capable of identifying a trait of a tape cartridge by identifying its source is illustrated. In FIG. 8, tape cartridge 116 is shown to include identifier 118. Detector 114A is shown to include cartridge interface 120, reporter 122, and LUT (Look-Up-Table) 124. Identifier 118 represents generally any memory storing identifying data. The identifying data can be any data that at least indirectly identifies a tape cartridge as being of a particular type. Identifying data may be data that is unique to a source or manufacturer of tape cartridge 116. For example, a tape cartridge from one source will include identifier data different from that of a tape cartridge from a different source.

Cartridge interface 120 represents generally any combination of hardware and/or programming capable of communicating with identifier 118 to obtain identifying data for cartridge 116. For example, identifier 118 may be an RFID (Radio Frequency Identification) tag and cartridge interface 120 may be a reader capable of activating the tag to obtain the identification data wirelessly via link 126. Alternatively, tape cartridge 116 may include electrical contacts that enable a physical connection 126 between identifier 118 and cartridge interface 120.

Reporter 122 represents generally any combination of hardware and/or programming capable of supplying equalization engine 76A with tuning data corresponding to identification data obtained by cartridge interface 120. Tuning data is data that can be used by equalization engine 76A to generate an equalization signal having particular characteristics. As discussed below, those characteristics can include the timing and shape or duty cycle of the equalization pulses.

In performing its task, reporter 122 may utilize LUT 124. LUT 124 represents generally any data source having entries that correlate identification data with tuning data. Using identification data obtained from cartridge interface 120, reporter 122 can retrieve tuning data from LUT 124 corresponding to that identification data and pass the tuning data for use by equalization engine 76A. Equalization engine 76A can then generate an equalization signal with pulses having characteristics defined, at least in part, according to the tuning data.

Moving to FIG. 9, write channel 26D is capable of identifying a trait of a magnetic medium by sampling the particular characteristics of a read signal corresponding to a known set of write data encoded on the magnetic medium. The trait, in this example, are the characteristics of the read signal. In FIG. 9, detector 114B is shown to include read interface 128, reporter 130, and LUT 132. Read interface 128 represents generally any combination of hardware and/or programming capable of sampling a read signal corresponding to a known set of write data encoded on the magnetic medium. Reporter 130 represents generally any combination of hardware and/or programming capable of comparing one or more characteristics of the sampled read signal with expected characteristics.

Reporter 130 is then responsible for providing tuning data to equalization engine 76A based on differences, if any, between the sampled characteristics and the expected characteristics. Expected characteristics are characteristics of a read signal corresponding to write data encoded using an equalization signal tuned to the particular magnetic medium in use. In other words, when a known set of write data is encoded using an equalization signal tuned to the magnetic medium, the read signal corresponding to that write data will have certain expected characteristics (within a given tolerance). Such characteristics can in include the shape and timing of the pulses in the read signal.

In performing its tasks, reporter 130 may utilize LUT 132. LUT 132 represents generally any data source having entries that directly or indirectly correlate tuning data with difference data, or any hardware that relates input signals to output tuning control signals. Difference data is any data that at least indirectly represents the difference between sampled characteristics and expected characteristics of a read signal corresponding to a known set of write data. For example, difference data may include data representing the expected characteristics of various read signals each corresponding to a unique set of write data. After sampling a read signal, reporter 130 can ascertain both the sampled characteristics and, in many cases, the set of write data. With that information, reporter 130 can access LUT 132 to obtain the expected characteristics for a read signal corresponding to that write data. Based on the differences, if any, between the sampled characteristics and the expected characteristics, reporter 130 can then retrieve the appropriate tuning data from LUT 132.

Alternatively LUT, may simply correlate expected characteristics of a read signals with a sets of write data corresponding to those read signals. Knowing the set of write data corresponding to a sampled read signal, reporter 130 can obtain the expected characteristics from LUT 132. Reporter 130 will then determine a difference between the sampled characteristics of the read signal and the expected characteristics and calculate the appropriate tuning data based on that difference.

Reporter 130 is provided a number of opportunities to perform its tasks during the normal operation of a media drive. When a magnetic medium such as a tape cartridge is first used, a calibration process is performed in which test data is written and then read back to verify proper operation. Reporter 130 can "piggy-back" on this calibration process to sample a read signal and supply tuning data to equalization engine 76A. Alternatively, in a verification process, data written to a magnetic medium is read back either periodically or continuously to verify a current recording process. Reporter 130 could "piggy-back" on the verification process to periodically sample read signals and supply tuning data to equalization engine 76A in real time.

FIG. 10 illustrates examples of variably shaped write equalization pulses. FIG. 11 illustrates examples of variably shaped and timed write equalization pulses. FIGS. 12-14 are flow diagrams illustrating method steps for implementing various embodiments. Starting with FIG. 10, a write clock signal is referenced as 134. Write equalization clock signal is referenced as 136 and has a period T. Each pulse of write clock signal 134 has a width 5T. Signals 138-144 illustrate variously shaped write equalization pulses. Restated, signals 138-144 have varying duty cycles. The duty cycle of each may, for example, be selected after identifying a trait of a magnetic medium being written to. The particular duty cycle selected in a give case depends on an identified trait of that medium.

The equalization pulses of signals 138-144 each have a period of 5T equal to the pulse width of write clock 134 and are timed to coincide with the pulses of write clock 134. In other words, the rising edge of each equalization pulse in signals 138-144 coincides with a rising or falling edge of write clock signal 134. Signal 138 has a duty cycle of 1.5T/5T. Signal 140 has a duty cycle of 2T/5T. Signal 142 has a duty cycle of 2.5T/5T, and signal 144 has a duty cycle of 3T/5T. In these examples, the duty cycles are based on the timing of edges of clock signal 136. Other means to vary the duty cycle can include analog implementations using, as examples, programmable or switched delays (e.g., RC, LC delay lines).

The duty cycle of each signal in FIG. 10 may correspond to a particular trait of a magnetic medium. As an example, for a magnetic medium from one identified source, write equalization pulses of signal 138 may be defined. For a magnetic medium from another source, write equalization pulses of signal 140 may be defined. Similarly, for a read signal having particular sampled characteristics, write equalization pulses of signal 142 may be defined and for a read signal having different sampled characteristics, write equalization pulses of signal 144 may be defined.

The particular timing and duty cycles illustrated in FIG. 10 and the possible basis for the selection of each are shown for example only. There may be fewer or more possible selections of any suitable duty cycle. FIG. 10 is provided only to help illustrate that a shape (duty cycle) of a write equalization pulse can be defined based on a trait of a magnetic medium.

Moving to FIG. 11, a write clock signal is referenced as 146. Write equalization clock signal 148 has a period T. Each pulse of write clock signal 146 has a width 5T. Signals 150-156 illustrate variously shaped and timed write equalization pulses. The duty cycle of each may, for example, be selected after identifying a trait of a magnetic medium being written to. The particular duty cycle selected in a given case depends on an identified trait of that medium.

The equalization pulses of signals 150-156 each have a period varying from 4.5T to 6T. The equalization pulse of signal 150 has a duty cycle of 2T/5T and is timed to so that its falling edge coincides with a falling edge of write clock signal 146. The equalization pulse of signal 152 has a duty cycle of 3T/6T and is also timed to so that its falling edge coincides with a falling edge of write clock signal 146. However the rising edge of the equalization pulse of signal 152 is timed to occur 1T earlier than that of the equalization pulse of signal 150. The equalization pulse of signal 154 has a duty cycle of 2T/4.5T and is also timed to so that its falling edge coincides with a falling edge of write clock signal 146. However the equalization pulse of signal 154 is timed to conclude 0.5T sooner than the equalization pulses of signals 150 and 152. The equalization pulse of signal 156 has a duty cycle of 3T/5T and is timed to so that its rising edge coincides with the rising edges of the equalization pulses of signals 150 and 154. However the falling edge of the equalization pulse of signal 156 occurs 1T after the failing edges of the write equalization pulses of signals 150-154.

The duty cycle of each signal in FIG. 11 may correspond to a particular trait of a magnetic medium. As an example, for a magnetic medium from one identified source, write equalization pulses of signal 150 may be defined. For a magnetic medium from another source, write equalization pulses of signal 152 may be defined. Similarly, for a read signal having particular sampled characteristics, write equalization pulses of signal 154 may be defined and for a read signal having different sampled characteristics, write equalization pulses of signal 156 may be defined.

The particular timing and duty cycles illustrated in FIG. 11 and the possible basis for the selection of each are shown for example only. There may be fewer or more possible available selections. FIG. 11 is provided only to help illustrate that a pulse shape (duty cycle) of a write equalization signal and the pulse timing can be selected based on a trait of a magnetic medium.

FIG. 12 is an exemplary flow diagram illustrating method steps for writing to magnetic media using a write equalization signal defined according to a trait of that medium. Initially, a trait of a magnetic medium is identified (step 158). A stream of write data is received and sampled (step 160). A write signal is generated for the sampled write data (step 162). Concurrently, a write equalization signal is generated for the write data (step 164). The equalization signal is defined to include characteristics such as particularly timed and/or shaped pulses determined according to the trait identified in step 158. The write signal and the equalization signal are multiplexed (step 166). The combined signal is then written to the magnetic media (step 168).

Referring back to FIG. 8 as an example, step 158 can involve detector 114 identifying a trait in the form of identifying data, that is, data identifying the source of the magnetic medium. Referring to FIG. 9, step 158 could instead involve detector 114 identifying a trait of the magnetic medium in the form of one or more sampled characteristics of a read signal. As noted above, the read signal may be sampled during a calibration procedure upon an initial use of the magnetic medium. The read signal may also be sampled in real-time during normal operation when recording and verifying data.

Step 160 can involve receiving the write data into data buffer 30 to be sampled by write signal engine 32 and equalization engine 76A. Steps 162 and 164 can be performed by write signal engine 32 and equalization engine 76 respectively. Multiplexer 80 combines the write signal and the write equalization signal in step 166 while read/write head(s) 18 encode the magnetic media in step 168 and the process repeats with step 158 or 160.

FIG. 12 is an exemplary flow diagram illustrating method steps for identifying a trait in the form of a source of a magnetic medium. Communication is established with a tape cartridge or other magnetic medium (step 170). Data is obtained from the magnetic medium (step 172). The data at least indirectly identifies a trait of the magnetic medium, the trait being the source. The data obtained in step 172 can then be used to tune or otherwise define an equalization signal.

FIG. 13 is an exemplary flow diagram illustrating method steps for identifying a trait in the form of characteristics of a read signal for a particular magnetic medium. Data is written to or otherwise encoded on the medium (step 174). The medium is read generating a read signal corresponding to the data written in step 174. The read signal is sampled to identify a trait of the magnetic medium, the trait being one or more characteristics of the read signal (step 178). Based on the read signal characteristics, an equalization signal is defined or otherwise tuned.

CONCLUSION: The schematic diagram of FIG. 1 illustrates an exemplary magnetic media drive in which embodiments may be implemented. Implementation, however, is not limited to the media drive shown. The block diagram of FIGS. 7-9 shows the architecture, functionality, and operation of various embodiments of the present invention. A number of the blocks are defined in part as programs. Each of those blocks may represent in whole or in part a module, segment, or portion of code that comprises one or more executable instructions to implement the specified logical function(s). Each block may also represent a circuit or a number of interconnected circuits to implement the specified logical function(s).

Also, the present invention can be embodied at least in part, in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, infrared, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

Although the flow diagrams of FIGS. 12-14 show specific orders of execution, the orders of execution may differ from that which is depicted. For example, the order of execution of two or more blocks may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. A medium dependent write equalization method, comprising:
    identifying a trait of a magnetic medium;
    generating a write equalization signal that erases a portion of the magnetic medium and has a characteristic defined, at least in part, according to the trait of the magnetic medium; and
    varying a width of the write equalization signal to adjust writing to a magnetic medium whose trait has been determined, wherein the width of the write equalization signal is dynamically adjusted as the magnetic medium is being written to in order to tune the write equalization signal to the magnetic medium.

2. The method of claim 1, wherein:
    identifying a trait of a magnetic medium comprises identifying a source of the magnetic medium; and
    generating comprises generating a write equalization signal having a characteristic defined according to the source of the magnetic medium.

3. The method of claim 1, wherein
    identifying a trait of a magnetic medium comprises identifying a characteristic of a read signal; and
    generating comprises generating a write equalization signal having a characteristic defined according to the characteristic of the read signal.

4. The method of claim 1, wherein generating comprises generating a write equalization signal that includes one or more write equalization pulses having a shape defined according to the identified trait.

5. The method of claim 1, wherein generating comprises generating a write equalization signal that includes one or more write equalization pulses having a shape and timing defined according to the identified trait.

6. The method of claim 1, further comprising:
    generating a write signal for a stream of write data;
    combining the equalization signal with the write signal; and
    utilizing the combined signal to encode a representation of the write data on the magnetic medium.

7. A medium dependent write equalization method, comprising:
    identifying a manufacturer of a magnetic medium to determine a trait of the magnetic medium;
    generating a write signal for a stream of write data;
    generating, for the write data, a write equalization signal having a characteristic defined, at least in part, according to the trait of the magnetic medium;
    combining the equalization signal with the write signal;
    utilizing the combined signal to encode a representation of the write data on the magnetic medium; and adjusting a duty cycle of the write equalization signal as the magnetic medium is being written to.

8. The method of claim 7 further comprising:
    reading an identifier on a tape cartridge having the magnetic medium;
    using a Look-Up-Table to identify the manufacturer.

9. A computer readable medium having instructions for:
    identifying a trait of a magnetic medium;
    generating a write equalization signal erasing at least a portion of the magnetic medium and having a characteristic defined, at least in part, according to the trait of the magnetic medium; and
    changing timing and shaping of the write equalization signal after identifying a magnetic medium whose trait has been determined, wherein the timing and shaping of the write equalization signal are dynamically adjusted as the magnetic medium is being written to in order to tune the write equalization signal to the magnetic medium.

10. The medium of claim 9, wherein the instructions for:
    identifying a trait of a magnetic medium include instructions for identifying a source of the magnetic medium; and
    generating include instructions for generating a write equalization signal having a characteristic defined according to the source of the magnetic medium.

11. The medium of claim 9, wherein the instructions for:
    identifying a trait of a magnetic medium include instructions for identifying a characteristic of a read signal; and
    generating include instructions for generating a write equalization signal having a characteristic defined according to the characteristic of the read signal.

12. The medium of claim 9, wherein the instructions for generating include instructions for generating a write equalization signal that includes one or more write equalization pulses having a shape defined, according to the identified trait.

13. The medium of claim 9, wherein the instructions for generating include instructions for generating a write equalization signal that includes one or more write equalization pulses having a shape and timing defined according to the identified trait.

14. The medium of claim 9, having further instructions for:
    generating a write signal for a stream of write data;
    combining the equalization signal with the write signal; and
    utilizing the combined signal to encode a representation of the write data on the magnetic medium.

15. A computer readable medium having instructions for:
    identifying a manufacturer of a magnetic medium to determine a trait of the magnetic medium;
    generating a write signal for a stream of write data;
    generating, for the write data, a write equalization signal having a characteristic defined, at least in part, according to the trait of the magnetic medium;
    combining the equalization signal with the write signal;
    utilizing the combined signal to encode a representation of the write data on the magnetic medium; and adjusting a duty cycle of the write equalization signal as the magnetic medium is being written to.

16. The medium of claim 15 further comprising:
    reading an identifier on a tape cartridge having the magnetic medium;
    using a Look-Up-Table to identify the manufacturer.

17. A write channel for a magnetic storage device having a write head, the write channel comprising:
    a write signal engine operable to generate a write signal corresponding to a stream of write data;
    a detector operable to identify a trait of a magnetic medium;
    an equalization engine operable to generate, for the write data, an equalization signal having a characteristic defined according to the identified trait; and
    a multiplexer operable to combine the write equalization signal with the write signal, the combined signal to be utilized by the write head to encode the write data on the magnetic medium, wherein a width of the equalization signal is dynamically adjusted as the magnetic medium is being written in order to tune the equalization signal to the magnetic medium.

18. The write channel of claim 17, wherein the detector is operable to identify a trait of the magnetic medium by at least indirectly identifying a source of the magnetic medium.

19. The write channel of claim 17, wherein the detector is operable to identify a trait of the magnetic medium by identifying a characteristic of a read signal.

20. The write channel of claim 17, wherein the equalization engine is operable to generate a write equalization signal having one or more write equalization pulses shaped according to the identified trait.

21. The write channel of claim 17, wherein the equalization engine is operable to generate a write equalization signal having one or more write equalization pulses shaped and timed according to the identified trait.

22. A magnetic media drive, comprising:

a write channel comprising a write signal engine operable to generate a write signal corresponding to a stream of write data, a detector operable to identify a trait of a magnetic medium, an equalization engine operable to generate a write equalization signal having a characteristic defined according to the identified trait, and a multiplexer operable to combine the write equalization signal with the write signal;

a tape take-up reel;

a write head in communication with the write channel and positionable adjacent to a tape path extending past the write head to the take-up reel, the write head operable to utilize the combined signal from the write channel to encode the write data on a magnetic medium traveling along the tape path; and an electronic controller configured to receive write instructions and the write data from a computer or other host device and to control operation of the take-up reel, the write heads, and the write channel, wherein a duty cycle of the write equalization signal is dynamically adjusted as the magnetic medium is being written in order to tune the write equalization signal to the magnetic medium.

* * * * *

UNITED STATES PATENT AND TRADEMARK OFFICE
CERTIFICATE OF CORRECTION

PATENT NO. : 7,480,110 B2  Page 1 of 1
APPLICATION NO. : 11/106246
DATED : January 20, 2009
INVENTOR(S) : Steven L. Brittenham It is certified that error appears in the above-identified patent and that said Letters Patent is hereby corrected as shown below:

In column 9, line 21, delete "failing" and insert -- falling --, therefor.

In column 12, line 19, in Claim 12, delete "defined," and insert -- defined --, therefor.

In column 14, line 14, in Claim 22, delete "heads" and insert -- head, --, therefor.

Signed and Sealed this

Sixteenth Day of November, 2010

David J. Kappos
*Director of the United States Patent and Trademark Office*